United States Patent
Ahmed et al.

(10) Patent No.: US 8,446,974 B2
(45) Date of Patent: May 21, 2013

(54) BLIND MECHANISM FOR THE JOINT ESTIMATION OF FREQUENCY OFFSET AND PHASE OFFSET FOR QAM MODULATED SIGNALS

(75) Inventors: I Zakir Ahmed, Bangalore (IN); Krishna Bharadwaj, Bangalore (IN); Vijaya Yajnanarayana, Bangalore (IN)

(73) Assignee: National Instruments Corporation, Austin, TX (US)

( * ) Notice: Subject to any disclaimer, the term of this patent is extended or adjusted under 35 U.S.C. 154(b) by 662 days.

(21) Appl. No.: 12/694,388

(22) Filed: Jan. 27, 2010

(65) Prior Publication Data

US 2011/0182387 A1  Jul. 28, 2011

(51) Int. Cl.
*H04L 5/12* (2006.01)
(52) U.S. Cl.
USPC ........... 375/261; 375/260; 375/259; 375/316; 375/326; 375/340; 375/324; 375/233; 455/73
(58) Field of Classification Search .................. 375/261, 375/260, 259, 316, 326, 340, 324, 233; 455/73
See application file for complete search history.

(56) References Cited

U.S. PATENT DOCUMENTS

2004/0120422 A1* 6/2004 Lin et al. ........................ 375/316

OTHER PUBLICATIONS

Michel Terre, Nicolas Paul, and Luc Fety; "Blind Frequency Estimation for Short 16 QAM Radio Burst"; 17th Annual IEEE International Symposium on Personal, Indoor and Mobile Radio Communications (PIMRC'06); 2006; 5 pages.
Ling Chen, Hiroji Kusaka, and Masanobu Kominami; "Blind Phase Recovery in QAM Communication Systems Using Higher Order Statistics"; IEEE Signal Processing Letters, vol. 3, No. 5, May 1996; 3 pages.
Qijia Liu, Zhixing Yang, Jian Song, and Changyong Pan; "A Novel QAM Joint Frequency-Phase Carrier Recovery Method"; ICACT2006; Feb. 20-22, 2006; 5 pages.
G. Panci, P. Campisi, S. Colonnese, and G. Scarano; "Blind Phase Recovery for QAM Constellations"; EUSIPCO 2004; 4 pages.

* cited by examiner

*Primary Examiner* — Zewdu Kassa
(74) *Attorney, Agent, or Firm* — Meyertons, Hood, Kivlin, Kowert & Goetzel, P.C.; Jeffrey C. Hood; Mark K. Brightwell

(57) ABSTRACT

A mechanism for jointly correcting carrier phase and carrier frequency errors in a demodulated signal. A computer system may receive samples of a baseband input signal (resulting from QAM demodulation). The computer system may compute values of a cost function J over a grid in a 2D angle-frequency space. A cost function value $J(\theta,\omega)$ is computed for each point $(\theta,\omega)$ in the grid by (a) applying a phase adjustment of angle $\theta$ and a frequency adjustment of frequency $\omega$ to the input signal; (b) performing one or more iterations of the K-means algorithm on the samples of the adjusted signal; (c) generated a sum on each K-means cluster; and (d) adding the sums. The point $(\theta_e,\omega_e)$ in the 2D angle-frequency space that minimizes the cost function J serves an estimate for the carrier phase error and carrier frequency error. The estimated errors may be used to correct the input signal.

20 Claims, 10 Drawing Sheets embodiment 900A

US 8,446,974 B2

BLIND MECHANISM FOR THE JOINT ESTIMATION OF FREQUENCY OFFSET AND PHASE OFFSET FOR QAM MODULATED SIGNALS

FIELD OF THE INVENTION

The present invention relates to the field of telecommunication, and more specifically, to a system and method for correcting phase offset and frequency offset errors associated with quadrature amplitude modulation (QAM) systems.

DESCRIPTION OF THE RELATED ART

When a receiver demodulates a QAM signal, the receiver-generated carrier signal does not perfectly match the actual carrier in frequency and phase. That phase error and frequency error causes impairments to the demodulated signal, which can lead to errors in information recovery from the demodulated signal. Thus, there exists a need for mechanisms capable of correcting those impairments.

In the following paper, Terre et al. disclose a method for estimating frequency error in the absence of phase error: Michel Terré, Nicolas Paul, Luc Féty, "Blind Frequency Estimation For Short 16 QAM Radio Burst", IEEE International Symposium on Personal, Indoor and Mobile Radio Communications, September 2006, pages 1-5. The method of that paper fails in the presence of phase error.

SUMMARY

A mechanism for estimating the phase offset error and the frequency offset error associated with a demodulated signal is disclosed herein. The estimated errors may be used to correct the demodulated signal, thereby resulting in a more perfect representation of an originally-transmitted signal.

In one set of embodiments, a method for correcting carrier phase and carrier frequency errors in a demodulated signal may involve the following operations.

First, a computer system may receive samples of an input signal, where the input signal is a complex baseband signal resulting from a demodulation of a modulated signal. The modulated signal is assumed to have been modulated according to a quadrature amplitude modulation (QAM) having a K-point constellation, where K is an integer greater than one.

The computer system may then compute values of a cost function J over a 2D grid that covers a portion of a 2D angle-frequency space. A cost function value $J(\theta,\omega)$ is computed for each point $(\theta,\omega)$ in the 2D grid. The cost function value $J(\theta,\omega)$ for the point $(\theta,\omega)$ may be computed by: (a) generating samples of a modified signal, where the modified signal is related to the input signal by a phase adjustment of angle $\theta$ and a frequency adjustment of frequency $\omega$; (b) performing N iterations of the K-means clustering algorithm on the samples of the modified signal to determine a partition of the samples into K clusters and to determine K mean positions corresponding to the K clusters; (c) for each of the K clusters, computing a corresponding sum of squared distances over the cluster, where the squared distances are relative to the mean position of the cluster; and (d) adding the sums to obtain the cost function value $J(\theta,\omega)$.

The computer system may determine a point $(\theta_e,\omega_e)$ in the 2D angle-frequency space that minimizes the cost function J.

The computer system may then correct the samples of the input signal to obtain samples of a corrected signal. The correction may include applying a phase adjustment of angle $\theta_e$ and a frequency adjustment of frequency $\omega_e$ to the samples of the input signal.

In some embodiments, the computer system may operate on the corrected signal samples to recover a stream of information bits.

In some embodiments, the angle $\theta_e$ and the frequency $\omega_e$ may be used to adjust the frequency and the phase of a local carrier signal in a receiver (e.g., in the demodulator of a receiver).

BRIEF DESCRIPTION OF THE DRAWINGS

A better understanding of the present invention can be obtained when the following detailed description of the preferred embodiments is considered in conjunction with the following drawings.

Figure 1:
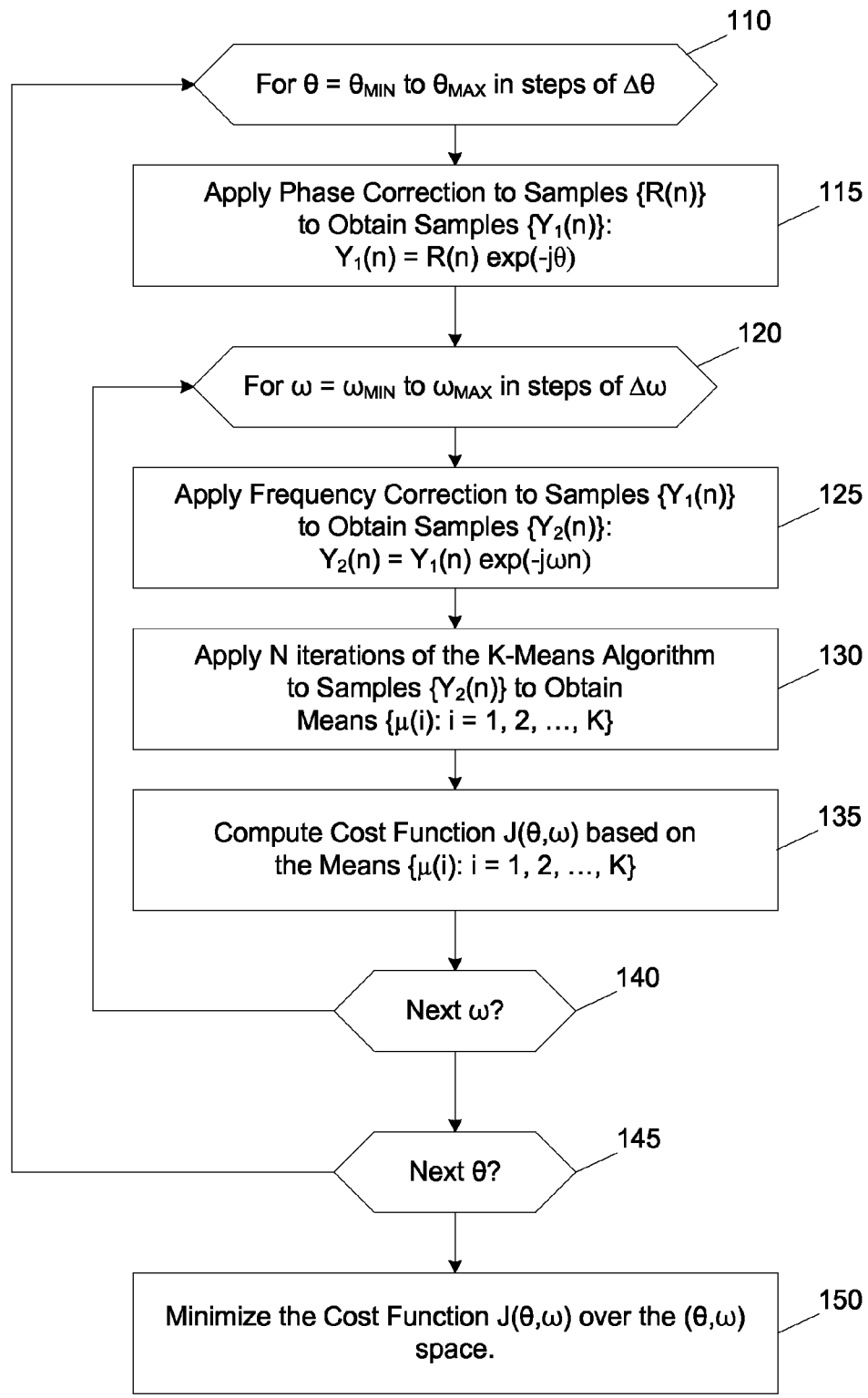
FIG. 1 illustrates one set of embodiments of a method for correcting the phase offset error and frequency offset error associated with a QAM demodulated signal.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

The following is a glossary of terms used in the present document.

Memory Medium—A memory medium is a medium configured for the storage and retrieval of information. Examples of memory media include: various kinds of semiconductor memory such as RAM and ROM; various kinds of magnetic media such as magnetic disk, tape, strip and film; various kinds of optical media such as CD-ROM and DVD-ROM; various media based on the storage of electrical charge and/or other physical quantities; media fabricated using various lithographic techniques; etc. The term "memory medium" may also include a set of two or more memory media which reside at different locations, e.g., at different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning As used herein, the term "program" means: 1) a software program which may be stored in a memory and is executable by a processor, or, 2) a hardware configuration program useable for configuring a programmable hardware element. Any of the method embodiments described herein, or, any combination of the method embodiments described herein, or, any subset of any of the method embodiments described herein, or, any combination of such subsets may be implemented in terms of one or more programs.

Software Program—the term "software program" is intended to have the full breadth of its ordinary meaning, and includes any type of program instructions, code, script and/or data, or combinations thereof, that may be stored in a memory medium and executed by a processor. Exemplary software programs include: programs written in text-based programming languages such as C, C++, Java™, Pascal, Fortran, etc.; graphical programs (programs written in graphical programming languages); assembly language programs; programs that have been compiled to machine language; scripts; and other types of executable software. A software program may comprise two or more subprograms that interoperate in some manner.

Hardware Configuration Program—a program, e.g., a netlist or bit file, that can be used to program or configure a programmable hardware element.

Graphical Program—A program comprising a plurality of interconnected nodes or icons, where the plurality of interconnected nodes or icons visually indicate the functionality of the program. A graphical program is a type of diagram.

The following provides examples of various aspects of graphical programs. The following examples and discussion are not intended to limit the above definition of graphical program, but rather provide examples of what the term "graphical program" encompasses.

The nodes in a graphical program may be connected in one or more of a data flow, control flow, and/or, execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, where the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, a unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, where the connections between the nodes indicate that data produced by one node is used by another node.

Node—In the context of a graphical program, an element that may be included in a graphical program. The graphical program nodes in a graphical program may also be referred to as blocks. A node may have an associated icon that represents the node in the graphical program, as well as underlying code and/or data that implements functionality of the node. Exemplary nodes (or blocks) include function nodes, sub-program nodes (sub-VIs), terminal nodes, structure nodes, etc. Nodes may be connected together in a graphical program by connection icons or wires.

Graphical User Interface—this term is intended to have the full breadth of its ordinary meaning. The term "Graphical User Interface" is often abbreviated to "GUI". A GUI may include one or more input GUI elements, one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses.

A GUI may comprise a single window having one or more GUI Elements, or may comprise more than one window each having one or more GUI Elements.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and that enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input, and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, switches, text input boxes, numeric input fields, etc.

Output Indicator—a graphical user interface element for displaying output from a program. Exemplary output indicators include charts, graphs, gauges, text output boxes, numeric displays, etc. An output indicator is sometimes referred to as an "output control".

Computer System—any of various types of computing or processing systems, including a personal computer (PC), a mainframe computer system, a workstation, a laptop, a network appliance, an Internet appliance, a hand-held device, a personal digital assistant (PDA), a television system, a grid computing system, or other device or combinations of devices. In general, the term "computer system" can be broadly defined to encompass any device (or combination of devices) having at least one processor that is configured to execute instructions that are stored on a memory medium.

Measurement Device—includes instruments, data acquisition devices, smart sensors and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card, a video capture board, a smart camera, a motion control device, a robot having machine vision, and other similar types of devices. Exemplary "stand-alone" instruments include oscilloscopes, multimeters, signal analyzers, signal demodulators, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs or FPGA's.

A computer-readable memory medium is a memory medium that stores program instructions and/or data, where the program instructions, if executed by a computer system, cause the computer system to perform, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium. The memory medium stores program instructions. The processor is configured to read and execute the program instructions from the memory medium. The program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a wearable computer, etc.

In some embodiments, a set of computers distributed across a network may be configured to partition the effort of executing a computational method (e.g., any of the method embodiments disclosed herein). In some embodiments, a first computer may be configured to receive a modulated signal and perform demodulation on the modulated signal to generate a demodulated signal. The first computer may send the samples of the demodulated signal to a second computer through the network. The second computer may operate on the demodulated signal samples according to any of the method embodiments described herein, or, any combination of the method embodiments described herein, or, any subset of any of the method embodiments described herein, or, any combination of such subsets.

Let V denote the constellation of an M-ary QAM. (QAM is an acronym for quadrature amplitude modulation. M is an integer greater than or equal to two.) Thus, V is a set containing M distinct points in the complex plane. Let X={X(n)} denote a discrete-time baseband signal, where n is the discrete-time index (also referred to as the sample index), where the samples X(n) of the baseband signal X belong to the set V. Thus, each sample X(n) is an element of the constellation V and may be represented in polar form by the expression:

$$X(n)=S(n)\exp[j\alpha(n)], \quad (1)$$

where S(n) is the magnitude of the constellation point X(n), where α(n) is the phase of the constellation point X(n).

In the process of transmission, the baseband signal X may be subjected to corrupting influences. Thus, a receiver that employs ordinary means for demodulation may recover a baseband signal R that is related to X by the following expression:

$$R(n)=S(n)\exp[j(\omega_0 n+\theta_0+\alpha(n))]+G(n), \quad (2)$$

where exp(.) denotes the exponential function, where $\omega_0$ is a frequency offset of the carrier, where $\theta_0$ is a phase error that corresponds to the phase offset of the carrier, where G(n) is additive noise.

As variously disclosed herein, the receiver may operate on the samples {R(n)} to obtain an estimate $\omega_e$ for the frequency offset $\omega_0$ and an estimate $\theta_e$ for the phase offset $\theta_0$. Furthermore, the receiver may use the estimates $\omega_e$ and $\theta_e$ to compute an estimate Y for the original baseband signal X according the expression:

$$Y(n)=R(n)\exp[-j(\omega_e n+\theta_e)]. \quad (3)$$

In one set of embodiments, the method for estimating the frequency offset $\omega_0$ and the phase offset $\theta_0$ may include the operations illustrated in FIG. 1. As suggested in the figure, the estimation method may involve computing a cost function $J(\theta,\omega)$ over a grid in $(\theta,\omega)$ space and then selecting the point $(\theta_e,\omega_e)$ that minimizes the cost function. Thus, the estimation method includes a loop that steps through successive values of $\theta$. The operations 110 and 145 are meant to suggest this loop on $\theta$, which starts at $\theta=\theta_{MIN}$, ends at $\theta=\theta_{MAX}$, and steps by amount $\Delta\theta$. The values $\theta_{MIN}$, $\theta_{MAX}$ and $\Delta\theta$ may be determined based on user input.

At operation 115, a phase correction is applied to the samples $\{R(n)\}$ based on the current value of $\theta$ in order to obtain samples $\{Y_1(n)\}$. The phase correction is computed based on the expression:

$$Y_1(n)=R(n)\exp[-j\theta]. \quad (4)$$

Within the $\theta$ loop, there is another loop, i.e., a loop on $\omega$. The operations 120 and 140 are meant to suggest this loop on $\omega$, which starts at $\omega=\omega_{MIN}$, ends at $\omega=\omega_{MAX}$, and steps by amount $\Delta\omega$. The values $\omega_{MIN}$, $\omega_{MAX}$ and $\Delta\omega$ may be determined based on user input. The $\omega$ loop includes the following operations.

At operation 125, a frequency correction is applied to the samples $\{Y_1(n)\}$ based on the current frequency value $\omega$ in order to obtain samples $\{Y_2(n)\}$. The frequency correction is computed based on the expression:

$$Y_2(n)=Y_1(n)\exp[-j\omega n]. \quad (5)$$

At operation 130, one or more iterations of the K-means clustering algorithm are performed on the samples $\{Y_2(n)\}$. The number N of iterations performed may vary from one implementation to the next, e.g., depending on the processing bandwidth available for the implementation.

The K-means algorithm is a well-known clustering algorithm. Thus, the details of that algorithm need not and will not be repeated here. (If the reader requires a tutorial on the K-means algorithm, please consult J. Hartigan and M. Wong "A K-Means Clustering Algorithm", Journal of Applied Statistics, 1979, vol. 28, pp. 100-108.)

The samples $\{Y_2(n)\}$ are complex numbers. Thus, for the application of the K-means clustering, the samples $\{Y_2(n)\}$ are interpreted as vectors in the 2D plane. The N iterations of the K-means clustering algorithm result in a partition of the samples $\{Y_2(n)\}$ into K clusters $C_1, C_2, \ldots, C_K$, where K is the number of points in the QAM constellation, i.e., K=M. The mean position $\mu_i$ of each cluster $C_i$ is also a by-product of the K-means clustering algorithm.

The K-means clustering algorithm requires an initial guess for the set of mean positions $\{\mu_i: i=1, 2, \ldots, K\}$. In some embodiments, the initial guess is the set V of constellation points. In another embodiment, the initial guess is generated randomly.

At operation 135, the cost function value $J(\theta,\omega)$ is computed for the current value of the $\theta$ and the current value of w based on the samples $\{Y_2(n)\}$ and on the mean positions $\{\mu_i: i=1, 2, \ldots, K\}$ determined by the K-means algorithm. The cost function value $J(\theta,\omega)$ may be computed according to the expression:

$$J(\theta,\omega) = \frac{\sum_{i=1}^{K} \sum_{Y_2(n)\in C_i} \|Y_2(n) - \mu_i\|^2}{K}, \quad (6)$$

where $\|*\|$ denotes the Euclidean norm or some other vector norm in the 2D plane. Observe that the inner summation is taken over samples $Y_2(n)$ belonging to cluster $C_i$. In alternative embodiments, the division by integer K may be omitted in order to decrease the computational load.

After the loop on $\theta$ has completed, the cost function $J(\theta,\omega)$ may be minimized over the grid in the $(\theta,\omega)$ space, as indicated at operation 150 of the figure. Standard techniques for the minimization of a function of two variables may be used here. For example, in one embodiment, the minimization is performed using the steepest descent technique. (For a description of the steepest descent technique, see, e.g., http://ddl.me.cmu.edu/ddwiki/index.php/Steepest_descent.)

The pair $(\theta_e,\omega_e)$ that minimizes the cost function $J(\theta,\omega)$ is taken as the estimate for the phase offset $\theta_0$ and the estimate for the frequency offset $\omega_0$. As noted above, these estimates may be used to correct the received samples $\{R(n)\}$ based on expression (3).

It is noted that that the position $(\theta_e,\omega_e)$ that minimizes the cost function $J(\theta,\omega)$ is not necessarily a point of the grid. In some embodiments, the minimizing position $(\theta_e,\omega_e)$ is estimated with a resolution finer that the grid resolution. For example, the shape of the function near the minimum may be modeled with an interpolating polynomial. The interpolating polynomial may be used to compute the finer resolution estimate of the minimum position.

Figure 2:
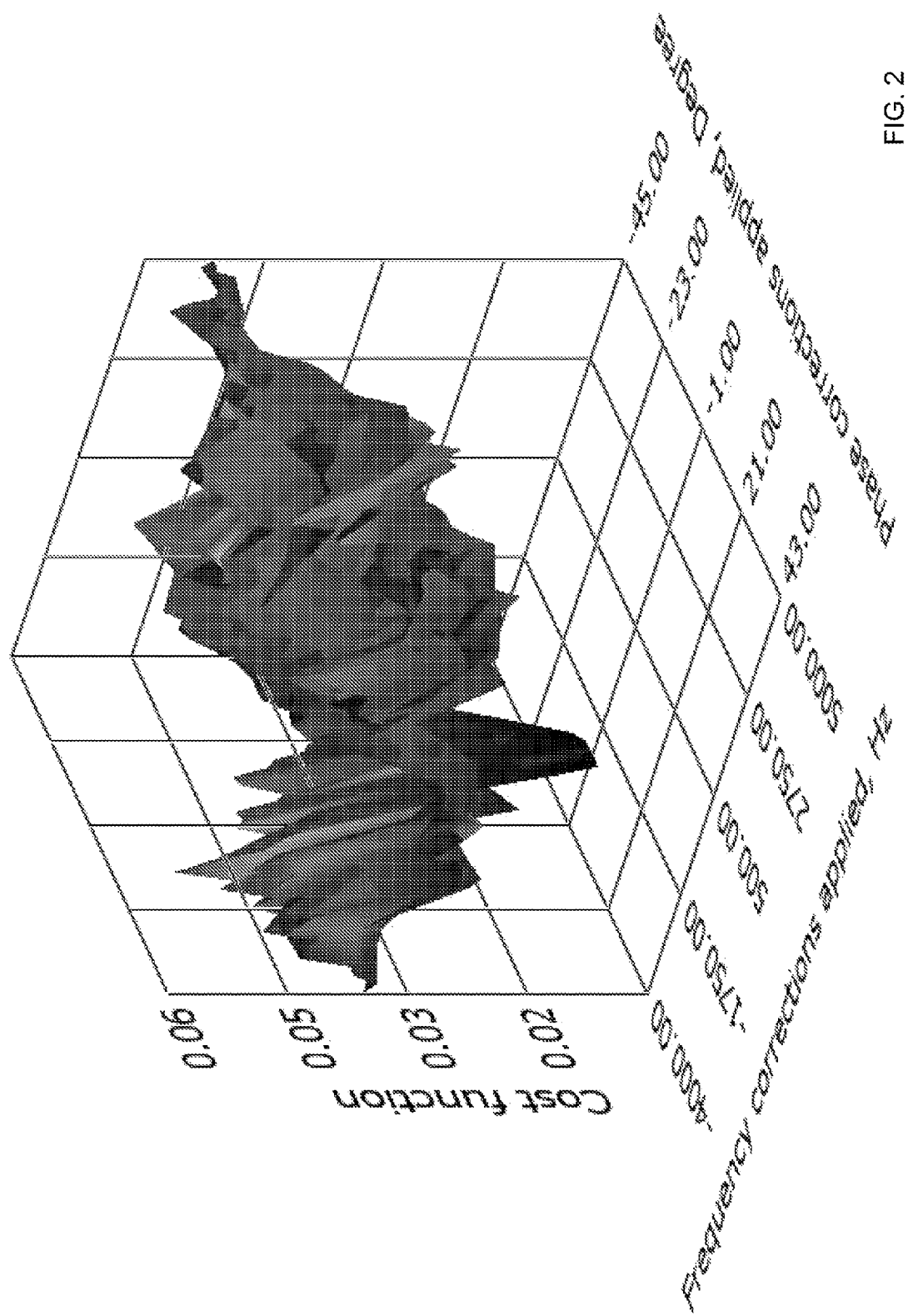
FIG. 2 is a graph of the cost function J produced in one example execution of the method of FIG. 1.

FIG. 2 illustrates an example of the cost function $J(\theta,\omega)$ obtained for a 64-QAM signal with frequency offset $f_0$ equal to −3000 Hz and phase offset $\theta_0$ equal to 10 degrees. The cost function was computed over a grid covering the rectangle:

[−4000 Hz,5000 Hz]×[−45 deg,43 deg].

In some embodiments, the over-sampling rate is greater than one. In other embodiments, the over-sampling rate is equal to one. The over-sampling rate is defined as the number of samples captured per symbol baseband signal R(n).

In one embodiment, the modulated signal is generated via amplitude modulation, which is a special case of QAM where the quadrature component is zero. The methods disclosed herein can be used in this special case.

Figure 3:
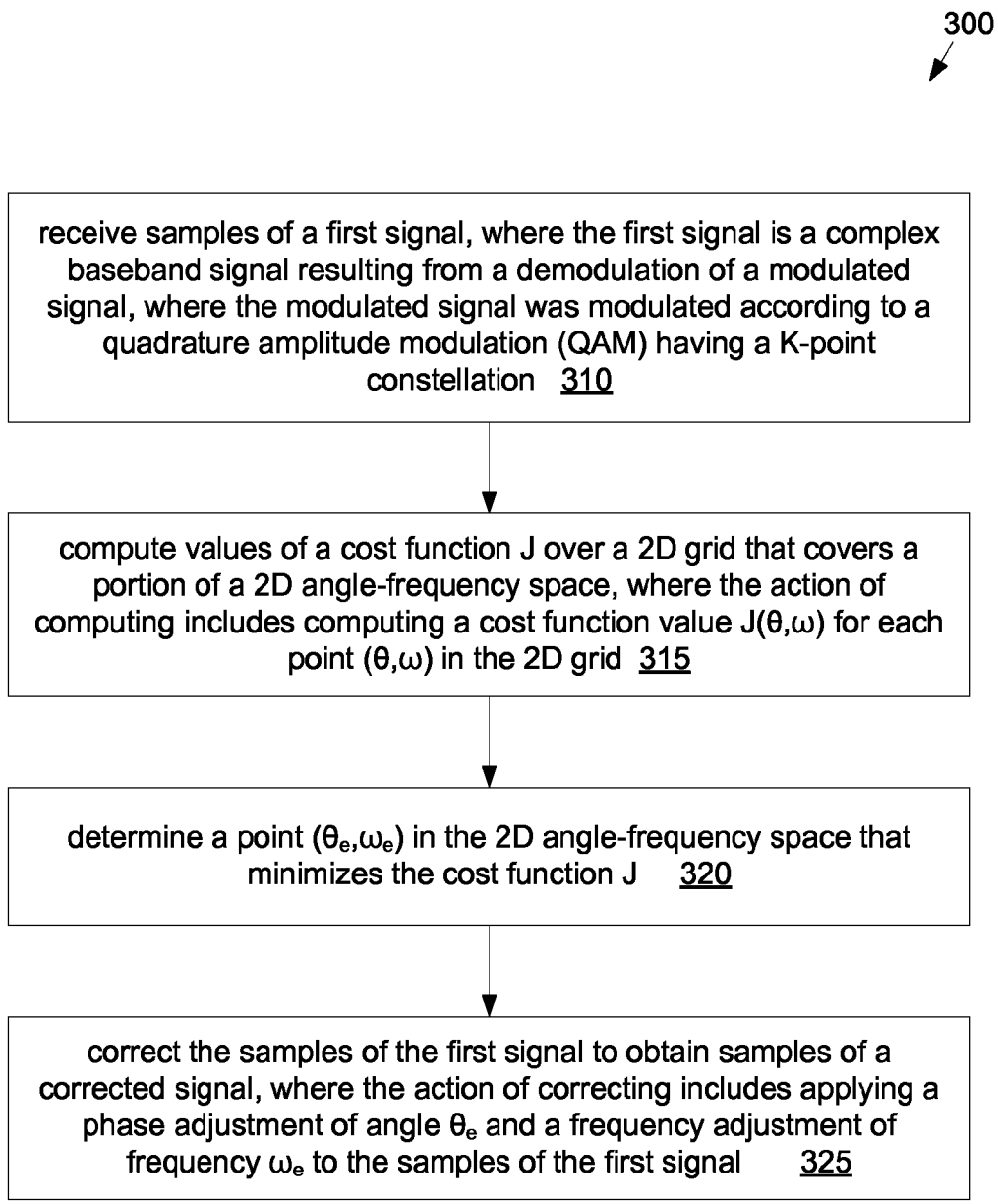
FIG. 3 illustrates another set of embodiments of a method for correcting the phase offset error and frequency offset error associated with a QAM demodulated signal.

In one set of embodiments, a method 300 for correcting carrier phase error and carrier frequency error of a receiver may involve the following operations, as illustrated in FIG. 3.

At 310, a computer system may receive samples of a first signal. The first signal is a complex baseband signal that results from a demodulation of a modulated signal. The modulated signal is assumed to have been modulated according to a quadrature amplitude modulation (QAM) having a K-point constellation. The process of QAM is very well known in the field of telecommunication. Thus, the QAM process need not and will not be described here.

The integer K is greater than one. In some embodiments, K is an even integer, e.g., an integer in the set {2, 4, 6, 8, 12, 16, 32, 64, 128, 256}.

At 315, the computer system may compute values of a cost function J over a 2D grid that covers a portion of a 2D angle-frequency space. The operation of computing the cost function values may include computing a cost function value $J(\theta,\omega)$ for each point $(\theta,\omega)$ in the 2D grid. The cost function value $J(\theta,\omega)$ may be determined as described above. See also the discussion below in connection with FIG. 4 for details on one method for computing the cost function value $J(\theta,\omega)$.

At 320, the computer system may determine a point $(\theta_e,\omega_e)$ in the 2D angle-frequency space that minimizes the cost function J. It is preferable that the global minimum of the cost function J be determined instead of a mere local minimum. Methods for minimizing a function of two variables are well known in the art. Any of a wide variety of minimization methods may be used here. A system implementer will understand that different minimization methods give different rates of convergence and require different amounts of computational labor.

It is noted that there is no requirement that all the values of the cost function J be computed before the minimization process is initiated. In some embodiments, the cost function values are computed during the minimization process.

At 325, the computer system may correct the samples of the first signal in order to obtain samples of a corrected signal. The correcting operation includes applying a phase adjustment of angle $\theta_e$ and a frequency adjustment of frequency $\omega_e$ to the samples of the first signal. The correcting operation may be performed as indicated in expression (3) above.

In some embodiments, the computer system may be included as part of a QAM receiver. The receiver may additionally include demodulation circuitry that is responsible for performing the QAM demodulation on the modulated signal to produce the first signal.

In some embodiments, the computer system may couple to a receiver through a computer network.

In some embodiments, the QAM is a phase shift keying (PSK) modulation. (PSK is special category of QAM, where the K-point constellation is constrained to a circle in the complex plane.)

In some embodiments, the 2D grid used to compute the cost function values is a rectangular grid. However, other types of grid are contemplated. For example, the 2D grid may be any one of the following: a triangular grid; a hexagonal grid; a grid having parallelograms as unit cells; a grid arising from an arbitrary 2D mesh, e.g., a computer generated mesh that fills a user-defined region of the 2D angle-frequency space.

In some embodiments, the point $(\theta_e,\omega_e)$ is determined with a resolution finer than the resolution of the 2D grid. For example, a fine estimate for the point $(\theta_e,\omega_e)$ may be determined using a polynomial fit as described above.

In some embodiments, the computer system may operate on the samples of the corrected signal to recover a stream of information bits. The information bits converted into a user-presentable form. For example, the information bits may be converted into a video stream, an audio stream, a text document, an image, etc., depending on the particular application being implemented. The computer system will include any display or presentation devices necessary for presenting the information to a user or a set of users.

In some embodiments, the process 315 of computing the values of the cost function J may be organized in terms of a first iterative loop and a second iterative loop, where the second iterative loop is situated within the first iterative loop. The first iterative loop is a loop on $\theta$, and the second iterative loop is a loop on $\omega$. In one alternative embodiment, the first iterative loop is a loop on $\omega$, and the second iterative loop is a loop on $\theta$.

In some embodiments, the computer system may interface with a demodulation system. The demodulation system may include circuitry for generating and adjusting a local carrier signal. The computer system may supply the angle $\theta_e$ and the frequency $\omega_e$ to the demodulation system. The demodulation system may adjust the frequency and the phase of the local carrier signal based on the angle $\theta_e$ and the frequency $\omega_e$. After this adjustment, the local carrier signal may be a more perfect replica of the actual carrier signal, and thus, give a higher quality of demodulation.

Figure 4:
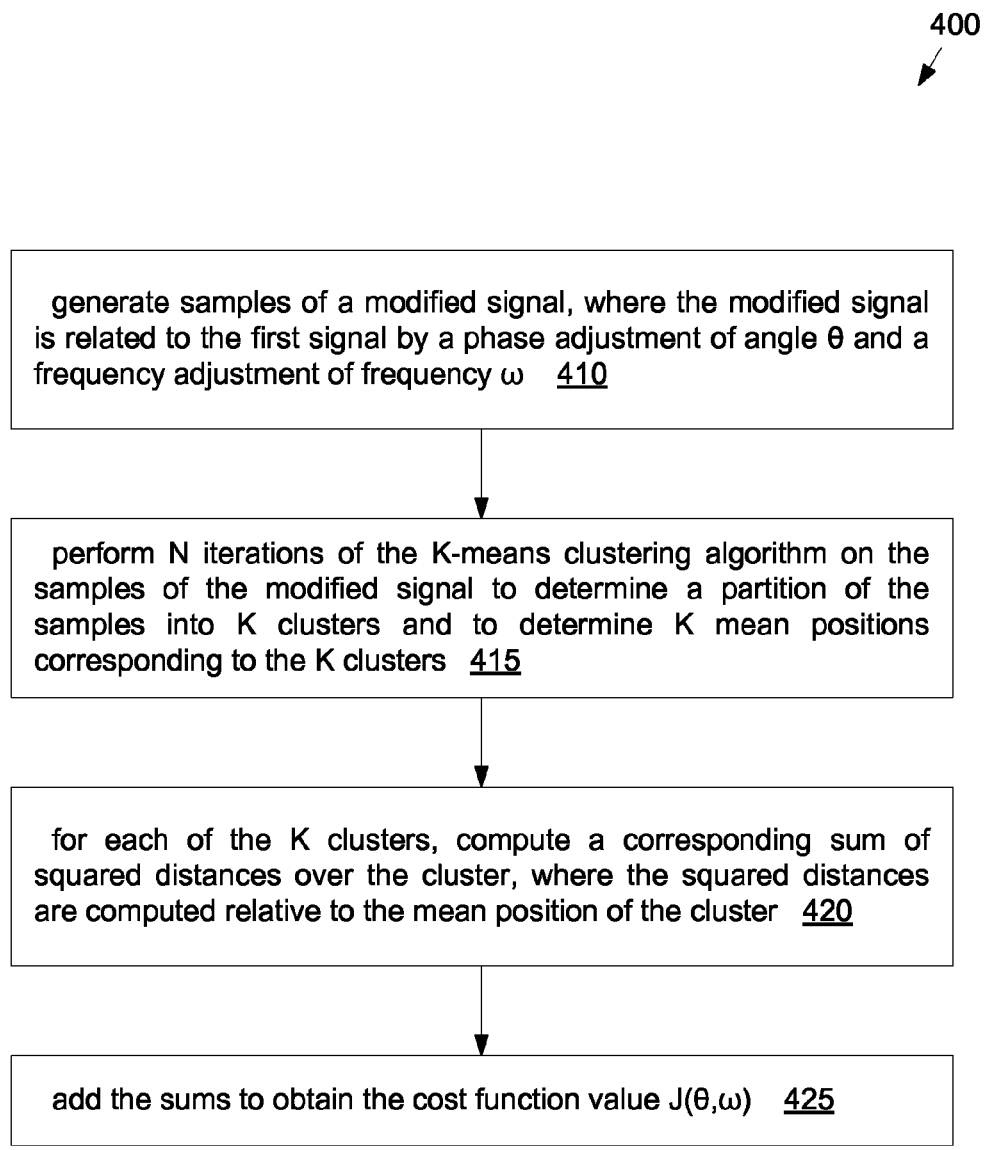
FIG. 4 illustrates one embodiment of a method for computing a cost function value $J(\theta,\omega)$.

In one set of embodiments, the action of computing the cost function value $J(\theta,\omega)$ at the point $(\theta,\omega)$ in the 2D grid includes the following operations, as illustrated in FIG. 4.

At 410, the computer system generates samples of a modified signal, where the modified signal is related to the first signal by a phase adjustment of angle $\theta$ and a frequency adjustment of frequency $\omega$. The phase adjustment and the frequency adjustment may be performed as indicated by expressions (4) and (5), respectively. Alternatively, the two adjustments may be performed together, as indicated by the following expression:

$$Y_2(n) = R(n)\exp[-j(\theta + \omega n)],$$

where $\{Y_2(n)\}$ represents the samples of the modified signal and $\{R(n)\}$ represents the samples of the first signal.

At 415, the computer system may perform N iterations of the K-means clustering algorithm on the samples of the modified signal to determine a partition of the samples into K clusters and to determine K mean positions corresponding to the K clusters. The value N is a positive integer. The process of performing the N iterations of the K-means clustering algorithm may include supplying the K-means clustering algorithm with the K points of the QAM constellation as an initial guess for the K mean positions.

In some embodiments, the number N is greater than one. In some embodiments, N is exactly equal to one.

For each of the K clusters, the computer system may compute a corresponding sum of squared distances over the cluster (i.e., over the samples within the cluster), as indicated at 420. The squared distances over the cluster are computed relative to the mean position of the cluster. For example, see the inner summation of expression (6) above.

At 425, the computer system may add the sums to obtain the cost function value $J(\theta,\omega)$. See, e.g., the outer summation of expression (6). The result of the addition may be normalized via a division by the value K. However, that normalization is optional.

Figure 5:
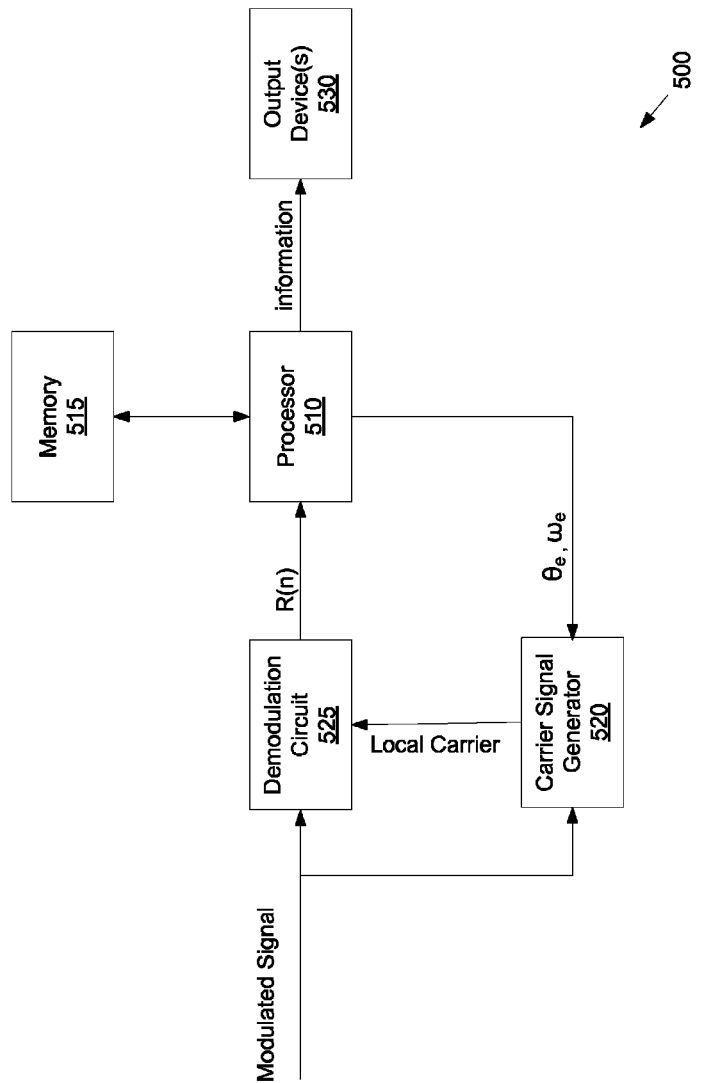
FIG. 5 illustrates one set of embodiments of an apparatus for correcting the phase offset error and frequency offset error associated with a QAM demodulated signal.

In one set of embodiments, an apparatus 500 may be configured to include a processor 510 and memory 515, e.g., as illustrated in FIG. 5. The memory 515 stores program instructions, which, if executed by the processor, cause the processor 510 to perform any of the method embodiments described herein, or, any combination of the method embodiments described herein, or, any subset of any of the method embodiments described herein, or, any combination of such subsets. For example, the program instructions may be configured to cause the processor to perform the method embodiment of FIG. 3 for computing the offset angle estimate $\theta_e$ and the offset frequency estimate $\omega_e$ from the demodulated baseband signal (i.e., "the first signal" in the discussion above).

In some embodiments, the apparatus may include (or couple to) a carrier signal generator 520 and a demodulator circuit 525. The carrier signal generator 520 may be configured to generate a local carrier signal. The demodulator circuit may be configured to generate the first signal based on the modulated signal and the local carrier signal. The carrier signal generator may be configured to adjust the phase and the frequency of the local carrier signal based on the angle $\theta_e$ and the frequency $\omega_e$.

Figure 6:
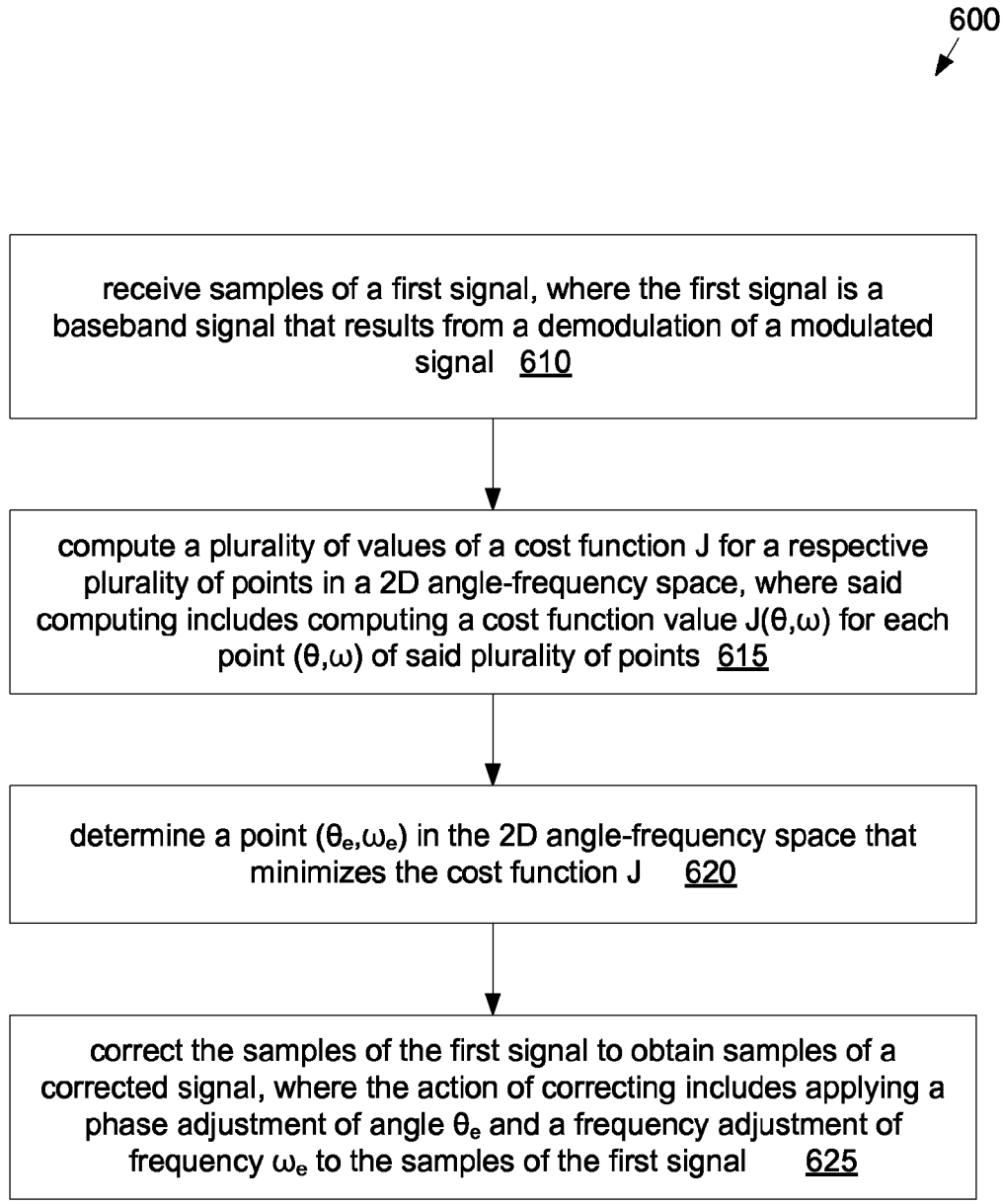
FIG. 6 illustrates another set of embodiments of a method for correcting the phase offset error and frequency offset error associated with a QAM demodulated signal.

In one set of embodiments, a method for estimating phase offset error and frequency offset error may involve the following operations, e.g., as illustrated in FIG. 6.

At 610, a computer system may receive samples of a first signal, where the first signal is a baseband signal that results from a demodulation of a modulated signal.

At 615, the computer system may compute a plurality of values of a cost function J for a respective plurality of points in a 2D angle-frequency space, where said computing includes computing a cost function value $J(\theta,\omega)$ for each point $(\theta,\omega)$ of said plurality of points. The computation of the cost function value $J(\theta,\omega)$ may be performed as variously described above. In one embodiment, the computation of the cost function value $J(\theta,\omega)$ is performed as described below in connection with FIG. 7.

At 620, the computer system may determine a point $(\theta_e,\omega_e)$ in the 2D angle-frequency space that minimizes the cost function J.

At 625, the computer system may correct the samples of the first signal to obtain samples of a corrected signal, where the action of correcting includes applying a phase adjustment of angle $\theta_e$ and a frequency adjustment of frequency $\omega_e$ to the samples of the first signal.

Figure 7:
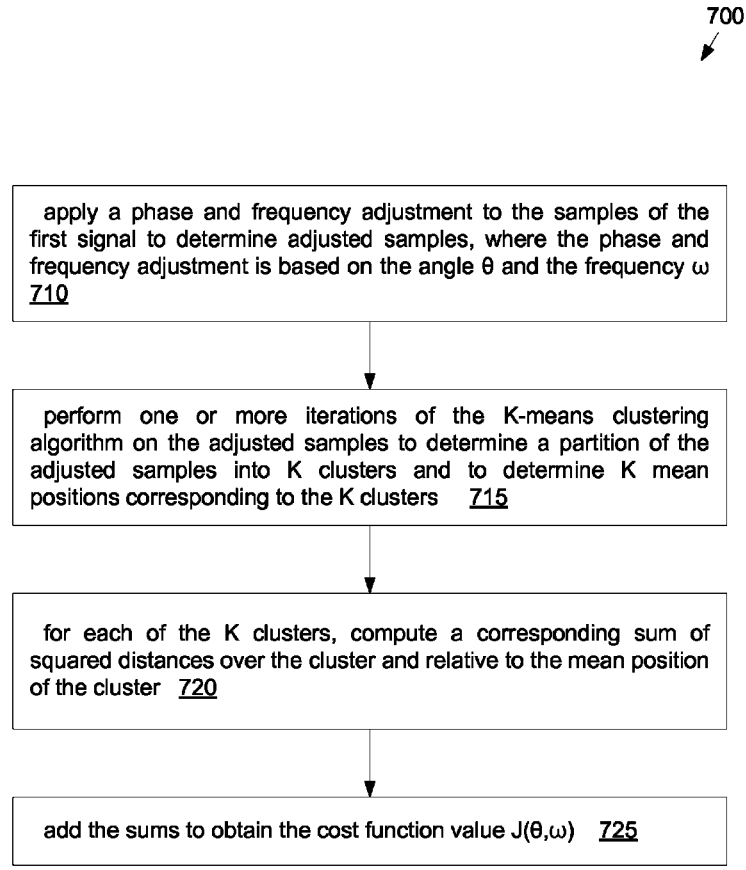
FIG. 7 illustrates one embodiment of a method for computing a cost function value $J(\theta,\omega)$.

In one set of embodiments, the process of computing the cost function value $J(\theta,\omega)$ for the point $(\theta,\omega)$ may involve the following operations, as shown in FIG. 7.

At 710, the computer system may apply a phase and frequency adjustment to the samples of the first signal to determine adjusted samples, where the phase and frequency adjustment is based on the angle $\theta$ and the frequency $\omega$.

At 715, the computer system may perform one or more iterations of the K-means clustering algorithm on the adjusted samples to determine a partition of the adjusted samples into K clusters and to determine K mean positions corresponding to the K clusters.

For each of the K clusters, the computer system may compute a corresponding sum of squared distances over the cluster and relative to the mean position of the cluster, as indicated at 720.

At 725, the computer system may add the sums to obtain the cost function value $J(\theta,\omega)$.

Furthermore, the computer system may recover a stream of information bits from the samples of the corrected signal, e.g., by mapping each of the samples to a nearest constellation point and then mapping the nearest constellation point to a corresponding set of information bits.

In some embodiments, the angle $\theta_e$ and the frequency $\omega_e$ may be used to adjust a frequency and a phase of a local carrier signal to improve the quality of demodulation.

Figure 8:
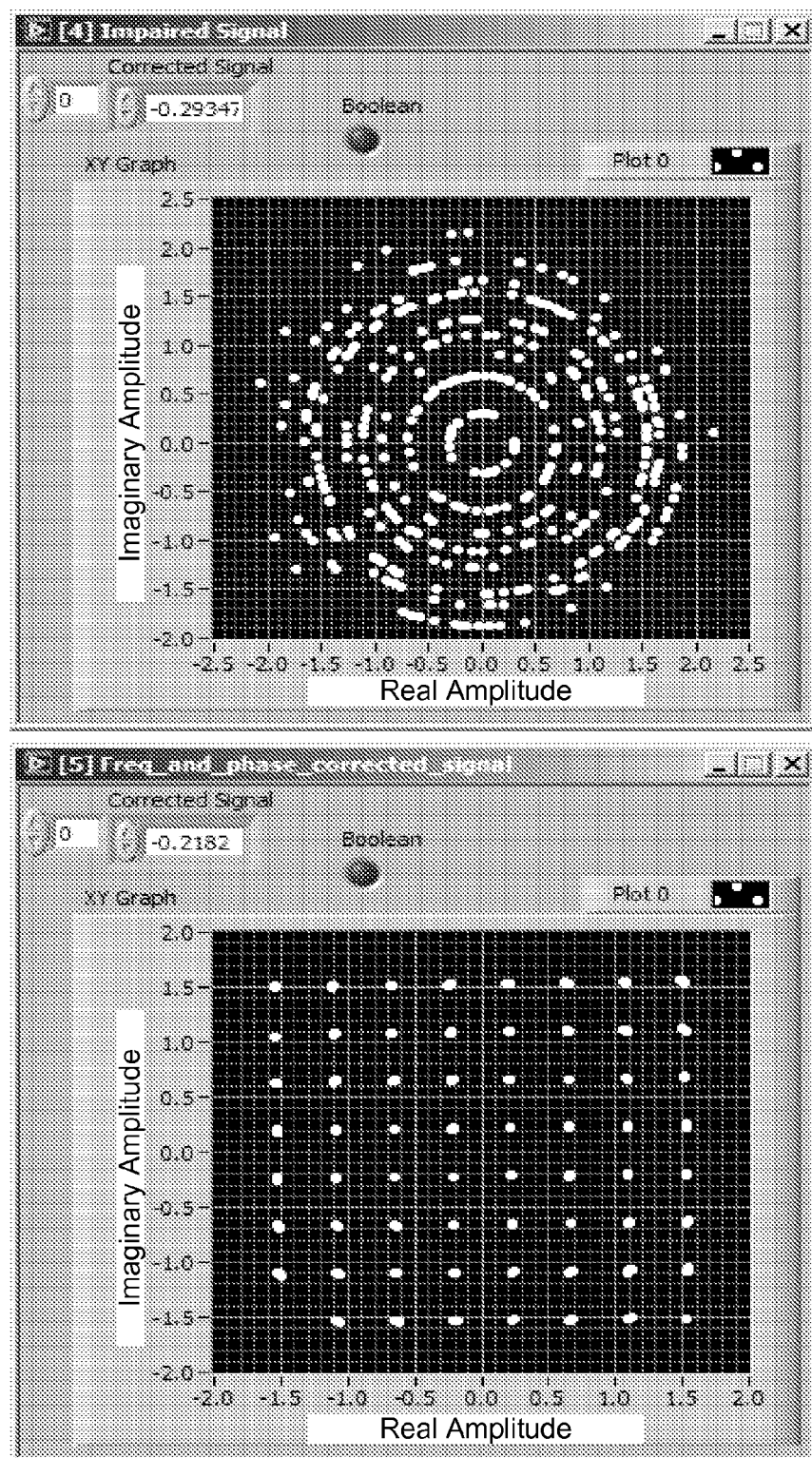
FIG. 8 illustrates an example of results produced by the execution of a method conforming to FIG. 1 or FIG. 3 or FIG. 7.

FIG. 8 illustrates an example of the results produced by a computation method conforming to method embodiment 300 and method embodiment 600. The figure refers to an "impaired signal". That impaired signal is the same as the "first signal" described above. The impaired signal was generated from a baseband 64-QAM signal by introducing a frequency offset of 3250 Hz and a phase offset of 27 degrees and adding noise in the complex plane. (400 symbols of the impaired signal were generated.) (The SNR was 35 db.) Observe how the samples of the impaired signal exhibit a circular pattern of scattering around the origin due to due the frequency offset. The 2D grid used to compute the values of the cost function has frequency stepsize equal to 100 Hz and phase stepsize equal to 2.25 degrees. Furthermore, the 2D grid covered the rectangular region given by the frequency interval [−5000 Hz, 5000 Hz] and the phase interval [−45 degrees, 45 degrees]. The frequency offset and the phase offset estimated by the computational method were 3200 Hz and 27 degrees, respectively. Observe also that the samples of a corrected signal are closely aligned to the points of an ideal 64-QAM constellation. This is an indication that the correction has been successful.

In some embodiments, the parameters $\theta_0$ and $\omega_0$ evolve in time. Thus, method embodiment of FIG. 3 (or FIG. 6) may be executed repeatedly to track the parameters as they move in time.

Figure 9:
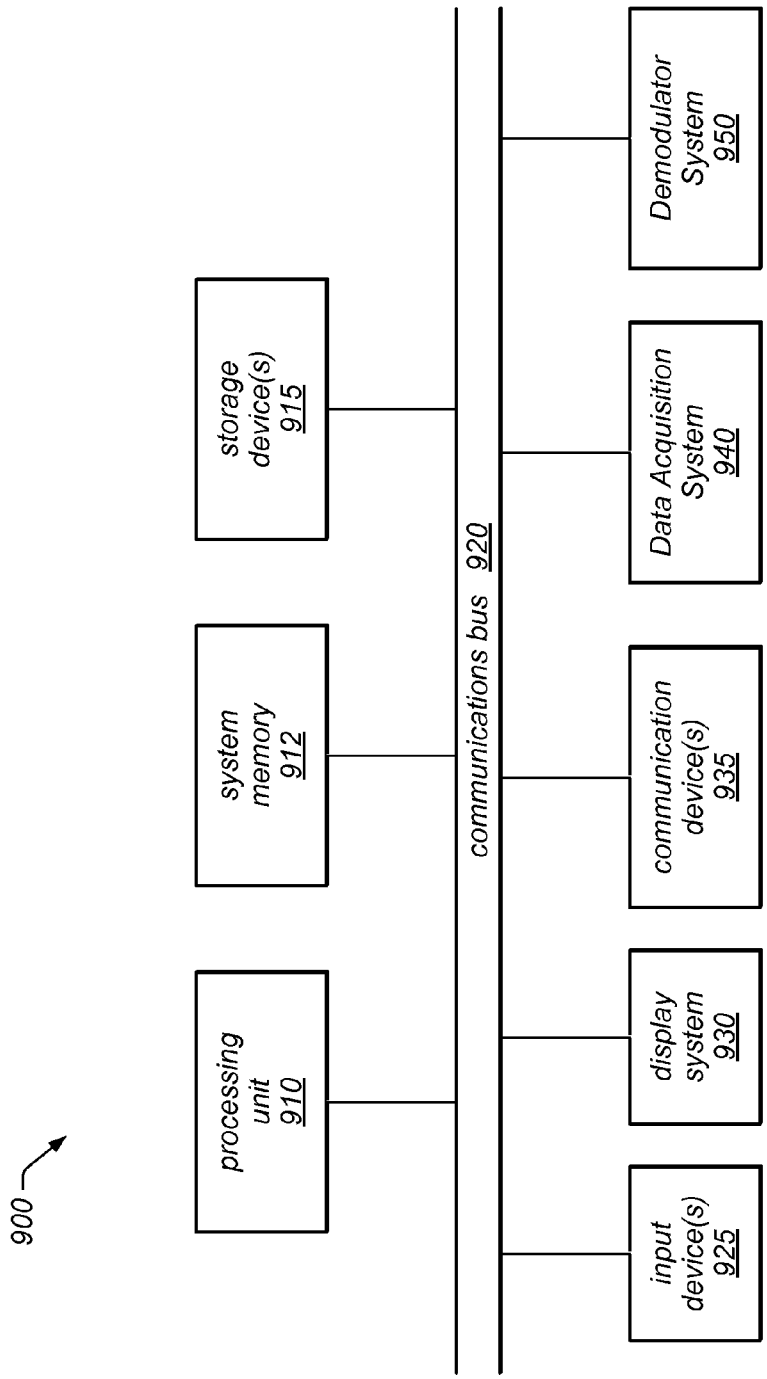
FIG. 9 illustrates one embodiment of a computer system 900 that may be used to perform any of the method embodiments described herein.

FIG. 9 illustrates one embodiment of a computer system 900 that may be used to perform any of the method embodiments described herein, or, any combination of the method embodiments described herein, or any subset of any of the method embodiments described herein, or, any combination of such subsets.

Computer system 900 may include a processing unit 910, a system memory 912, a set 915 of one or more storage devices, a communication bus 920, a set 925 of input devices, and a display system 930.

System memory 912 may include a set of semiconductor devices such as RAM devices (and perhaps also a set of ROM devices).

Storage devices 915 may include any of various storage devices such as one or more memory media and/or memory access devices. For example, storage devices 915 may include devices such as a CD/DVD-ROM drive, a hard disk, a magnetic disk drive, magnetic tape drives, etc.

Processing unit 910 is configured to read and execute program instructions, e.g., program instructions stored in system memory 912 and/or on one or more of the storage devices 915. Processing unit 910 may couple to system memory 912 through communication bus 920 (or through a system of interconnected busses). The program instructions configure the computer system 900 to implement a method, e.g., any of the method embodiments described herein, or, any combination of the method embodiments described herein, or, any subset of any of the method embodiments described herein, or any combination of such subsets.

Processing unit 910 may include one or more processors (e.g., microprocessors).

One or more users may supply input to the computer system 900 through the input devices 925. Input devices 925 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 930 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 900 may include other devices, e.g., devices such as one or more graphics accelerators, one or more speakers, a sound card, a video camera and a video card.

In some embodiments, computer system 900 may include one or more communication devices 935, e.g., a network interface card for interfacing with a computer network. In one embodiment, computer system 900 may receive a modulated signal and perform QAM demodulation on the modulated signal using such a communication device.

The computer system may be configured with a software infrastructure including an operating system, and perhaps also, one or more graphics APIs (such as OpenGL®, Direct3D, Java 3D™)

In some embodiments, the computer system 900 may be configured for coupling to a data acquisition system 940. The data acquisition system 940 is configured to receive analog inputs signals, to digitize the analog input signals, and to make those digitized signals available to the computer system 900. The data acquisition system 940 may operate under the control of the software executing on processor 910.

In some embodiments, the computer system 900 may be configured to interface with a specialized demodulator system 950, e.g., an off-the-shelf system designed for capturing RF signals and down-converting the captured signals, and sampling the down-converted signals.

Figure 10:
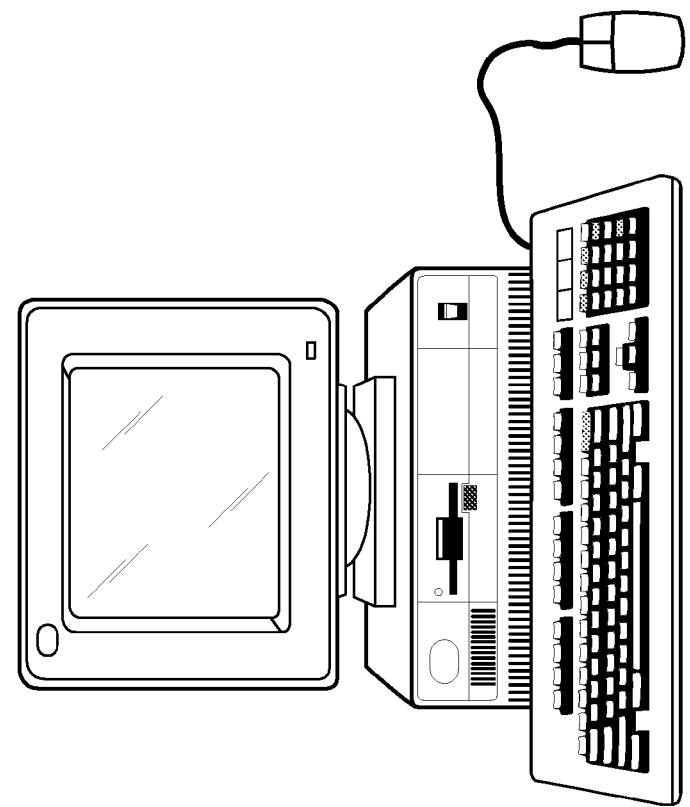
FIG. 10 illustrates one possible embodiment of computer system 900.

FIG. 10 illustrates one possible embodiment 900A for computer system 900.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A tangible non-transitory memory medium storing program instructions, wherein the program instructions, if executed by a processor, cause the processor to:
   receive samples of a first signal, wherein the first signal is a complex baseband signal resulting from a demodulation of a modulated signal, wherein the modulated signal was modulated according to a quadrature amplitude modulation (QAM) having a K-point constellation, wherein K is an integer greater than one;
   compute values of a cost function J over a two dimensional (2D) grid that covers a portion of a 2D angle-frequency space, wherein said computing includes computing a cost function value $J(\theta,\omega)$ for each point $(\theta,\omega)$ in the 2D grid, wherein, for each point $(\theta,\omega)$ in the 2D grid, said computing includes:
      generating samples of a modified signal, wherein the modified signal is related to the first signal by a phase adjustment of angle $\theta$ and a frequency adjustment of frequency $\omega$;
      performing N iterations of the K-means clustering algorithm on the samples of the modified signal to determine a partition of the samples into K clusters and to determine K mean positions corresponding to the K clusters, wherein N is a positive integer;
      for each of the K clusters, computing a corresponding sum of squared distances over the cluster, wherein the squared distances are relative to the mean position of the cluster;
      adding the sums to obtain the cost function value $J(\theta,\omega)$;
   determine a point $(\theta_e,\omega_e)$ in the 2D angle-frequency space that minimizes the cost function J;
   correct the samples of the first signal to obtain samples of a corrected signal, wherein said correcting includes applying a phase adjustment of angle $\theta_e$ and a frequency adjustment of frequency $\omega_e$ to the samples of the first signal.

2. The memory medium of claim 1, wherein the integer N is greater than one.

3. The memory medium of claim 1, wherein K is a power of two.

4. The memory medium of claim 1, wherein the QAM is a phase shift keying (PSK) modulation.

5. The memory medium of claim 1, wherein the 2D grid is a rectangular grid.

6. The memory medium of claim 1, wherein said computing the values of the cost function J is organized in terms of a first iterative loop and a second iterative loop, wherein the second iterative loop is situated within the first iterative loop, wherein the first iterative loop is a loop on $\theta$, wherein the second iterative loop is a loop on $\omega$.

7. The memory medium of claim 1, wherein the point $(\theta_e,\omega_e)$ is determined with a resolution finer than the resolution of the 2D grid.

8. The memory medium of claim 1, wherein the program instructions, if executed by the processor, further cause the processor to:
   recover a stream of information bits from the samples of the corrected signal.

9. The memory medium of claim 1, wherein the program instructions, if executed by the processor, further cause the processor to:
   adjust a frequency and a phase of a local carrier signal based on the angle $\theta_e$ and the frequency $\omega_e$.

10. The memory medium of claim 1, wherein the square distances are squared Euclidean distances.

11. The memory medium of claim 1, wherein said performing N iterations of the K-means clustering algorithm includes supplying the K-means clustering algorithm with the K points of the constellation as an initial guess for the K mean positions.

12. An apparatus comprising:
   a processor; and
   a memory storing program instructions, wherein the program instructions, if executed by the processor, cause the processor to:
      receive samples of a first signal, wherein the first signal is a complex baseband signal resulting from a demodulation of a modulated signal, wherein the modulated signal was modulated according to a quadrature amplitude modulation (QAM) having a K-point constellation, wherein K is an integer greater than one;
      compute values of a cost function J over a two dimensional (2D) grid that covers a portion of a 2D angle-frequency space, wherein said computing includes computing a cost function value $J(\theta,\omega))$ for each point $(\theta,\omega))$ in the 2D grid, wherein, for each point $(\theta,\omega))$ in the 2D grid, said computing includes:
         generating samples of a modified signal, wherein the modified signal is related to the first signal by a phase adjustment of angle $\theta$ and a frequency adjustment of frequency $\omega$;
         performing N iterations of the K-means clustering algorithm on the samples of the modified signal to determine a partition of the samples into K clusters and to determine K mean positions corresponding to the K clusters, wherein N is a positive integer;
         for each of the K clusters, computing a corresponding sum of squared distances over the cluster, wherein the squared distances are relative to the mean position of the cluster;
         adding the sums to obtain the cost function value $J(\theta,\omega)$; and
      determine a point $(\theta_e,\omega_e)$ in the 2D angle-frequency space that minimizes the cost function J.

13. The apparatus of claim 12, wherein the program instructions, if executed by the processor, cause the processor to:
   correct the samples of the first signal to obtain samples of a corrected signal, wherein said correcting includes applying a phase adjustment of angle $\theta_e$ and a frequency adjustment of frequency $\omega_e$ to the samples of the first signal.

14. The apparatus of claim 12, further comprising:
a carrier signal generator configured to generate a carrier signal; and
a demodulator circuit configured to generate the first signal based on the modulated signal and the carrier signal;
wherein carrier signal generator is configured to adjust a phase and a frequency of the carrier signal based on the angle $\theta_e$ and the frequency $\omega_e$.

15. A tangible non-transitory memory medium storing program instructions, wherein the program instructions, if executed by a processor, cause the processor to:
receive samples of a first signal, wherein the first signal is a baseband signal resulting from a demodulation of a modulated signal;
compute a plurality of values of a cost function J for a respective plurality of points in a two dimensional (2D) angle-frequency space, wherein said computing includes computing a cost function value $J(\theta,\omega)$ for each point $(\theta,\omega)$ of said plurality of points by:
applying a phase and frequency adjustment to the samples of the first signal to determine adjusted samples, wherein said phase and frequency adjustment is based on the angle $\theta$ and the frequency $\omega$;
performing one or more iterations of the K-means clustering algorithm on the adjusted samples to determine a partition of the adjusted samples into K clusters and to determine K mean positions corresponding to the K clusters;
for each of the K clusters, computing a corresponding sum of squared distances over the cluster and relative to the mean position of the cluster;
adding the sums to obtain the cost function value $J(\theta,\omega)$;
determine a point $(\theta_e,\omega_e)$ in the 2D angle-frequency space that minimizes the cost function J; and
correct the samples of the first signal to obtain samples of a corrected signal, wherein said correcting includes applying a phase adjustment of angle $\theta_e$ and a frequency adjustment of frequency $\omega_e$ to the samples of the first signal.

16. The memory medium of claim 15, wherein said computing the values of the cost function J is organized in terms of a first iterative loop and a second iterative loop, wherein the second iterative loop is situated within the first iterative loop, wherein the first iterative loop is a loop on $\theta$, wherein the second iterative loop is a loop on $\omega$.

17. The memory medium of claim 15, wherein the plurality of points belong to a 2D grid in the 2D angle-frequency space, wherein the point $(\theta_e,\omega_e)$ is determined with a resolution that is finer than the resolution of the 2D grid.

18. The memory medium of claim 15, wherein the program instructions, if executed by the processor, further cause the processor to:
recover a stream of information bits from the samples of the corrected signal.

19. The memory medium of claim 15, wherein the program instructions, if executed by the processor, further cause the processor to:
adjust a frequency and a phase of a local carrier signal based on the angle $\theta_e$ and the frequency $\omega_e$.

20. The memory medium of claim 15, wherein the integer K is a power of two.

* * * * *

UNITED STATES PATENT AND TRADEMARK OFFICE
CERTIFICATE OF CORRECTION

| | |
|---|---|
| PATENT NO. | : 8,446,974 B2 |
| APPLICATION NO. | : 12/694388 |
| DATED | : May 21, 2013 |
| INVENTOR(S) | : Ahmed et al. |

It is certified that error appears in the above-identified patent and that said Letters Patent is hereby corrected as shown below:

In the Claims:

Claim 12, Column 14, Lines 40-41, please delete "computing a cost function value $J(\theta,\omega))$ for each point $(\theta,\omega))$ in the 2D grid, wherein, for each point $(\theta,\omega))$ in" and substitute -- computing a cost function value $J(\theta,\omega)$ for each point $(\theta,\omega)$ in the 2D grid, wherein, for each point $(\theta,\omega)$ in --.

Signed and Sealed this
Sixth Day of August, 2013

Teresa Stanek Rea
*Acting Director of the United States Patent and Trademark Office*